United States Patent
Kompalik et al.

(10) Patent No.: US 10,093,842 B2
(45) Date of Patent: Oct. 9, 2018

(54) MOLDABLE MASS CONTAINING GRAPHITE AND PHASE CHANGE MATERIAL, PROCESS FOR PRODUCING A MOLDING FROM THE MASS, AND PRODUCTION METHODS OF USING THE MOLDING

(71) Applicant: SGL CARBON SE, Wiesbaden (DE)

(72) Inventors: Dieter Kompalik, Meitingen (DE); Sebastian Goepfert, Meitingen (DE)

(73) Assignee: SGL Carbon SE, Wiesbaden (DE)

( * ) Notice: Subject to any disclaimer, the term of this patent is extended or adjusted under 35 U.S.C. 154(b) by 163 days.

(21) Appl. No.: 14/485,984

(22) Filed: Sep. 15, 2014

(65) Prior Publication Data

US 2015/0001440 A1  Jan. 1, 2015

Related U.S. Application Data

(63) Continuation of application No. PCT/EP2013/055149, filed on Mar. 13, 2013.

(30) Foreign Application Priority Data

Mar. 13, 2012  (DE) ........................ 10 2012 203 924

(51) Int. Cl.
*C09K 5/00* (2006.01)
*C09K 5/06* (2006.01)
*F28D 20/02* (2006.01)

(52) U.S. Cl.
CPC ............ *C09K 5/063* (2013.01); *F28D 20/023* (2013.01); *Y02E 60/145* (2013.01)

(58) Field of Classification Search
None
See application file for complete search history.

(56) References Cited

U.S. PATENT DOCUMENTS

| | | |
|---|---|---|
| 7,575,804 B2 | 8/2009 | Lang-Witkowski et al. |
| 7,704,405 B2 | 4/2010 | Öttinger et al. |
| 7,923,112 B2 | 4/2011 | Christ et al. |
| 2003/0054230 A1 | 3/2003 | Ai-Hallaj et al. |
| 2008/0166555 A1* | 7/2008 | Lang-Wittkowski ...... B01J 2/20 428/402 |
| 2011/0089386 A1 | 4/2011 | Berry et al. |

FOREIGN PATENT DOCUMENTS

| | | |
|---|---|---|
| DE | 102005002411 A1 | 7/2006 |
| DE | 102010003663 A1 | 10/2011 |
| EP | 1416027 A1 | 5/2004 |
| EP | 1959212 A2 | 8/2008 |
| EP | 1972675 A2 | 9/2008 |
| WO | 2011124624 A1 | 10/2011 |

OTHER PUBLICATIONS

Xiao, Min et al., "Preparation and performance of shape stabilized phase change thermal storage materials with high thermal conductivity" Energy Conversion and Management, Elsevier Science Publishers, Oxford, GB, vol. 43, No. 1, Jan. 1, 2002, pp. 103-108, XP004311361, ISSN: 0196-8904, DOI: 10.1016/S0196-8904(01)00010-3 the whole document.

* cited by examiner

*Primary Examiner* — Necholus Ogden, Jr.
(74) *Attorney, Agent, or Firm* — Laurence A. Greenberg; Werner H. Stemer; Ralph E. Locher

(57) ABSTRACT

A moldable mass contains graphite and a phase change material (PCM). The moldable mass further contains a binder and microcapsules having the PCM. A process produces a molding from the moldable mass, and the molding is used to produce various products such as cooling elements, battery temperature control elements, cooling elements for vehicle cabins, electronic components, and motors.

17 Claims, No Drawings

MOLDABLE MASS CONTAINING GRAPHITE AND PHASE CHANGE MATERIAL, PROCESS FOR PRODUCING A MOLDING FROM THE MASS, AND PRODUCTION METHODS OF USING THE MOLDING

CROSS-REFERENCE TO RELATED APPLICATION

This is a continuation application, under 35 U.S.C. § 120, of copending international application No. PCT/EP2013/055149, filed Mar. 13, 2013, which designated the United States; this application also claims the priority, under 35 U.S.C. § 119, of German patent application No. 10 2012 203 924.4, filed Mar. 13, 2012; the prior applications are herewith incorporated by reference in their entireties.

BACKGROUND OF THE INVENTION

Field of the Invention

The invention relates to a moldable mass containing graphite and a phase change material, to a process for producing a molding from this mass and to a molding as well as to the use thereof.

In the operation of battery arrangements, in particular of secondary batteries (known as rechargeable batteries or storage batteries), it is important for the battery not to overheat. In particular, the temperature must not rise too much so as not to detract from the service life, energy density and charge capacity of the battery or even cause damage. On the other hand, the stated battery properties can be detracted from even at low temperatures. In particular lithium ion batteries react sensitively to unsuitable operating conditions.

It has in fact been proposed to provide a phase change material (PCM) as an embedding material in a battery arrangement, for example in the form of a battery pack or the like, between the individual battery cells, so as subsequently to cause excess heat to be absorbed in the form of latently stored heat, by way of a phase change of the PCM, if an excessive thermal budget occurs; however, the specific thermal conductivity of the proposed PCMs is very low, and so the charging and discharging dynamic is very low and insufficient for technical application.

For charging and discharging the PCM with heat, to increase the charging and discharging dynamic, graphite has been proposed as a thermally conductive and chemically inert material which is mixed with PCM or into the cavities of which PCM is infiltrated.

Conventionally, cooling packs which contain a graphite/PCM mixture are encased using a stable package so as to prevent liquid PCM from flowing out. However, stable packages of this type are generally not positioned in a positive fit on a battery cell pack, and can only be produced in a range of shapes and sizes at great expense.

U.S. patent publication No. 2003/0054230 A1 discloses a battery module in which a plurality of electrochemical cells, a PCM and a thermally conductive lattice, which may contain graphite inter alia, are brought together in a housing. In accordance with this teaching, a specially manufactured housing is therefore required for each battery arrangement.

Published, European patent application EP 1959212 A2 describes a wall element which forms a latent heat store and which contains two mutually spaced cover plates and a core layer, which fills up the gap between the two cover plates and contains a filling of microcapsules of a phase change material embedded in a plastics material casing (see EP 1959212 A2, abstract). The core layer may additionally contain a pulverulent thermal conductor, such as graphite (see EP 1959212 A2, paragraph [0009]). However, a construction of this type can only be attached to a battery cell pack in a positive fit at great expense.

SUMMARY OF THE INVENTION

The object is therefore to resolve the described drawbacks of the prior art, in particular to specify a process by which even structures of a complex shape containing graphite and a PCM, which can in particular be positioned in a positive fit on a battery cell pack, can be manufactured simply and cost-effectively.

The object is achieved by way of a moldable mass, containing graphite and a phase change material, the mass, according to the invention, containing a binder and microcapsules which contain the phase change material. The phase change material is also abbreviated in the following as PCM. The mass according to the invention is referred to in the following as a "moldable mass" or else simply "mass". It has the advantage that it can be molded well and can be made into complex, light structures simply and thus cost-effectively by conventional processes. Obviously, an at least approximately ball-shaped shape of the microcapsules makes the mass moldable and flowable. Moreover, the good workability of the molding mass makes it possible to produce desired surface geometries in a targeted manner, in such a way that, by contrast with a rigid package, it is possible to position a molding body, which can be produced using the mass, in a positive fit on battery cell packs for example.

Advantageously, the mass contains 1 to 60 wt. % graphite, 35 to 95 wt. % microcapsules containing PCM (also referred to in the following as microcapsulated phase change material (PCM)) and 1 to 50 wt. % binder. In these advantageous composition ranges, moldings can be produced which have a particularly good combination of properties out of mechanical strength, thermal conductivity and thus the ability to be charged and discharged with heat and/or cold and thermal storage capacity, the mass itself being very workable, for example moldable and flowable. Particularly advantageously, the mass contains 5 to 30 wt. % graphite, 60 to 90 wt. % microcapsules containing PCM and 5 to 10% binder, more advantageously 10 to 20 wt. % graphite, 75 to 85 wt. % microcapsules containing PCM and 5 to 10% binder.

The graphite is preferably selected from the group consisting of natural graphite, graphite expandate, comminuted graphite film and synthetic graphite. Depending on the application, one of these graphites or even any desired mixture thereof may be advantageous. Comminuted graphite film means any type of graphite expandate, compressed at least in part, which has been comminuted in any possible manner, for example by chaffing, grinding and other known processes. The individual types of graphite can each be used advantageously. Thus, for example, particles of graphite expandate can hook into one another particularly well, in spite of the presence of binder between and around the graphite particles. Thus, in addition to solidification by curing the binder, further mechanical stabilization of the molding to be produced can advantageously be achieved by compressing the graphite expandate.

In this context, the density of natural graphite is preferably between 2.0 and 2.2 g/cm$^3$, that of graphite expandate is preferably between 0.1 and 0.2 g/cm$^3$, that of comminuted graphite film is preferably between 1.0 and 1.8 g/cm³, and that of synthetic graphite is preferably between 1.8 and 2.2 g/cm³.

It may be advantageous for the natural graphite to be in particle sizes of between 149 and 840 µm, the graphite expandate to be in particle sizes of between 5 and 30 mm, the comminuted graphite film to be in particle sizes of between 5 and 1200 µm, and the synthetic graphite to be in particle sizes of between 10 and 600 µm.

In the context of the present invention, particle size specifications should be treated as average values. Thus, any reference to "particle size" always means the average particle size, unless anything to the contrary is disclosed or is obvious from the context.

In these particle size ranges, the graphite contributes to particularly good thermal conductivity in a molding produced using the mass, while simultaneously leading to good workability properties of the mass according to the invention.

Particularly preferably, the natural graphite is in particle sizes of between 180 and 300 µm, the graphite expandate is in particle sizes of between 10 and 20 mm, the comminuted graphite film is in particle sizes of between 50 and 500 µm, and the synthetic graphite is in particle sizes of between 150 and 300 µm.

Preferably, the binder is a binder selected from the group consisting of geopolymers, such as water-soluble sodium or potassium silicates, epoxy resins, phenol resins, silicone resins, polyester resins, thermoplastics such as polypropylene or fluoropolymers, and any desired combination thereof. When uncured or molten, these binders have viscosities which render them suitable for lending the workability thereof to the mass. Depending on the conditions of use, such as temperature and physic-chemical influences, of the molding to be produced using the mass, one of the stated inorganic or organic binders is preferred.

Preferably, the size of the microcapsules is from 1 to 1000 µm. In this size range, not only is the workability of the mass good, but the ability of the PCM in the microcapsules to be charged and discharged is very high because of the small distances in such small microcapsules. Particularly preferably, the size is between 5 and 200 µm, more preferably between 5 and 50 µm.

Preferably, the PCM is selected from the group consisting of paraffins, salt hydrates and other known PCMs, such as sugar alcohols or fatty acids. For example, pentaerythritol, trimethylolethane, erythritol, mannitol, neopentylglycol and any desired mixture thereof may be used as sugar alcohols. For example, capric acid, lauric acid, myristic acid, palmitic acid, stearic acid and any desired mixture thereof may be used as fatty acids. For example, calcium chloride hexahydrate, magnesium chloride hexahydrate, lithium nitrate trihydrate and sodium acetate trihydrate may be used as the salt hydrates. For example, saturated hydrocarbons of general molecular formula $C_nH_{2n+2}$ may be used as the paraffins, it being possible for the number n to between 18 and 32. The molar mass of paraffins of this type is therefore between 275 and 600 grams per mole. The paraffins may be categorized by melting point. Thus, for example, hard paraffin melts at between 50 and 60° C., and soft paraffin at approximately 45° C. What are known as microwaxes are also among the paraffins, and even have freezing points between 70 and 80° C., and have chain lengths (n) of up to 75 carbon atoms. Between the hard paraffins and the microwaxes are what are known as intermediates, in other words paraffins which have freezing points of from 60 to 70° C. Depending on the field of use of the molding to be produced, such as in particular the temperature, one of the stated PCM's is advantageously selected.

It may be advantageous for the mass to contain at least one additive, such as an additive which improves the properties of the mass and/or of the molding to be produced therefrom. This may advantageously be a surfactant, such as alkylbenzenesulphonate, or a fluxing agent, such as polycarboxylate ether, so as to increase the flowability of the mass by reducing the surface tension.

It may also be advantageous to add a dispersant, such as polyvinylpyrrolidone, to the mass as an additive so as to increase the dispersibility of the mass.

As a further additive, for example a substance which promotes the curing of the binder (in the following a curing-promoting substance) may be mixed in, such as a curing agent, and/or processes may be used which promote the curing of the binder, such as irradiation with IR, UV or similar high-energy radiation, or setting by $CO_2$ absorption.

The object is further achieved by way of a process. In the process according to the invention, the mass according to the invention is shaped into the molding, and the binder is cured in a solidification step. The process has the advantages mentioned previously above in the description of the molding mass, whereby the easily moldable mass merely has to be transformed into a molding, which is solidified to form a solid molding by curing the binder. As a result, even complexly shaped moldings can be produced simply and thus cost-effectively.

Advantageously, the step of shaping the mass is carried out by a conventional process, such as a process from the group consisting of casting processes, spraying processes, injection-molding processes, blow-molding processes, stamping processes, extrusion or calendering.

In the case of stamping, pressures of up to 400 MPa may advantageously be used, along with processing temperatures of between −22° C. and 220° C. In casting processes, heated or unheated casting moulds may advantageously be used, it being possible to work with or without oscillation technology.

Preferably, before the molding step the process contains a mixing step in which the components of the mass, such as in particular graphite, microcapsules containing PCM, and binder, and optionally additives, such as surfactants or dispersants or curing-promoting substances, are mixed. This advantageously increases the homogeneity of the mass, and thus of a molding to be produced from the mass.

Lödige mixers, Eirich mixers, Continua, Flexomix, compounders, mechanical heavy-duty mixers or turbomixers may advantageously be used for the mixing.

The mixing step may be carried out at temperatures of between −22° C. and 220° C., it being possible to vary the mixer size, mixer speed and mixing duration depending on the application, the binder, the particle size of the graphite etc.

Advantageously, 1 to 60 wt. % graphite, 35 to 95 wt. % microcapsulated phase change material and 1 to 50 wt. % binder and optionally further components, such as additives, are mixed.

It may be advantageous initially to mix the graphite and the microcapsules dry and subsequently to add the binder.

However, the microcapsules may also be stirred in a dispersant and the resulting dispersion mixed with the graphite wet. Preferably, the binder is used as the dispersant. In this case, no additional dispersant has to be added. Alternatively, polyvinylpyrrolidone or else polyacrylates may advantageously be used as dispersants.

The object is further achieved by way of a molding. The molding according to the invention, which is preferably produced using a mass according to the invention, particularly preferably by a process according to the invention, according to the invention contains graphite, microcapsulated phase change material, and binder which is cured at least in part, preferably completely cured.

Using the molding according to the invention, a molding is provided which meets high mechanical requirements and is also particularly well-suited to storing and charging and discharging heat and/or cold. The binder content brings about the high mechanical stability; the storage of heat and/or cold is made possible by the microcapsulated PCM, and the graphite makes the rapid charging and discharging of heat and/or cold possible.

Preferably, the molding according to the invention contains 1 to 60 wt. % graphite, 35 to 95 wt. % microcapsulated phase change material and 1 to 50 wt. % binder, particularly preferably 5 to 30 wt. % graphite, 60 to 90 wt. % microcapsulated phase change material and 5 to 10 wt. % binder, most preferably 10 to 20 wt. % graphite, 75 to 85 wt. % microcapsules containing PCM and 5 to 10 wt. % binder.

Surprisingly, the high binder content does not result in the storage and charging and discharging properties falling greatly by comparison with a mixture of graphite and PCM without any binder content.

Particularly advantageously, a molding according to the invention is produced using a mass according to the invention. As a result, all of the advantages stated previously in the description of the mass according to the invention are also obtained for the molding according to the invention.

According to a further aspect of the invention, a molding according to the invention is used for temperature control, such as in particular cooling and/or heating. Temperature increases and decreases can be buffered and dissipated. Thanks to the good workability and moldability, in combination with the above-disclosed processing processes, virtually all conceivable geometries can be produced. In combination with the various binders which can be used, a wide range of potential uses are thus possible. These include for example simply shaped semi-finished products, such as plates, rods and blocks. Further, cooling elements for batteries, such as secondary batteries, in particular lithium ion batteries, are a possible use. These may be plate-shaped, but may also complicated, for example L-shaped, C-shaped or trough-shaped.

Further uses according to the invention for moldings according to the invention are cooling elements for room cooling in architecture, such as cooling ceiling elements, cooling elements for vehicles, for example in vehicle cabins, for example for cars, lorries, mobile homes etc.

Use for absorbing, storing and emitting frictional heat, for example from motors such as electric motors, brakes, hub motors and the like, is also provided according to the invention.

Further, uses for temperature control at low external temperatures of for example below 15° C. for batteries may be mentioned. As a result of heat being stored, uniform operation of the cold-sensitive lithium ion batteries can be provided.

A further preferred use is passive cooling of stationary or movable charging devices, network parts, power electronics, electric motors and hub motors.

A further preferred use of the molding according to the invention is in photovoltaic modules, in particular as a cooling element in photovoltaic modules. The molding according to the invention is preferably attached to the side of the photovoltaic module remote from the sun. Semiconductor solar cells in photovoltaic modules have a decreasing efficiency of current production as the temperature increases. By buffering the temperature increase at sunrise, the efficiency of the photovoltaic module can thus be increased.

Other features which are considered as characteristic for the invention are set forth in the appended claims.

Although the invention is described herein as embodied in a moldable mass containing graphite and a phase change material, and a process for producing a molding from the mass, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DETAILED DESCRIPTION OF THE INVENTION

To produce a mass according to the invention, initially 2 kg graphite expandate having a density of 0.1 g/l are produced by conventionally expanding graphite salt. As the microcapsulated PCM, 7 kg MICRONAL® from BASF S.E., having a capsule size of between 2 and 20 µm, are stirred in 1 kg phenol resin as a dispersant. The resulting dispersion is mixed in an Eirich mixer with the graphite expandate for 0.5 h. Further, 120 g sodium dodecylbenzylsulphonate are added as a wetting agent, so as to increase the flowability of the resulting molding mass according to the invention.

Part of the mass is placed in a stamping machine and pressed at 300 MPa into a shape in the form of the base of the stamping machine, which is in the form of a curved cooling element. The phenol resin, which also acts as a binder for the mass, cures at temperatures of 180° C. The resulting molding is removed and is used as a cooling element of a lorry vehicle cabin. As a result of the high mechanical strength thereof, the element having a size of 60×60 cm can be installed self-supporting as a wall element in the vehicle cabin. It can store heat and cold and emit them into the cabin. As a result of the graphite content, rapid charging and discharging are achieved. The PCM stores the heat or cold and can ensure uniform temperature control as a result of the solid-liquid phase change thereof, without even dissipating heat out of the cabin. As a result of the paraffin being capsulated as PCM, no flammable fluid escapes in the event of an accident, but instead the molten paraffin remains safely enclosed by a polymethylmethacrylate (PMMA) casing.

Another part of the mass is placed in an injection-molding machine and is sprayed at high pressure into heated moulds which are in the shape of cooling elements for secondary battery systems, in this example lithium ion batteries. Even complicated geometries, for example having sharp edges of angularly shaped battery cells, can be produced according to the invention. The for example L-shaped molding fits onto a battery cell of this type in a positive fit.

According to a further variant of the embodiment, a sodium silicate solution is used as an inorganic binder and natural graphite is used as the graphite. These are processed together with the PCM-filled microcapsules from BASF, using a mechanical heavy-duty mixer, and the mass is not processed directly into moldings, but instead is compressed and sent to a processor, for example an aeroplane manufacturer, where the mass is injected on-site into the aeroplane structure at a predetermined place, for example the internal lining.

The invention claimed is:

1. A battery configuration, comprising:
a battery cell pack; and
a cooling element for maintaining a constant temperature of said battery cell pack, said cooling element having a form-fitting connection with said battery cell pack, said cooling element containing:
graphite;
a binder selected from the group consisting of epoxy resins and fluoropolymers; and
microcapsules containing a phase change material (PCM).

2. The battery configuration according to claim 1, wherein:
said graphite is 1 to 60 wt. %;
said microcapsules containing said PCM is 35 to 95 wt. %; and
said binder is 1 to 50 wt. %.

3. The battery configuration according to claim 1, wherein said graphite is selected from the group consisting of natural graphite, graphite expandate, comminuted graphite film, synthetic graphite and any desired combination thereof.

4. The battery configuration according to claim 3, wherein:
said natural graphite has particle sizes of between 149 and 840 μm;
said graphite expandate has particle sizes of between 5 and 30 mm;
said comminuted graphite film has particle sizes of between 5 and 1200 μm; and
said synthetic graphite has particle sizes of between 10 and 600 μm.

5. The battery configuration according to claim 1, wherein:
said microcapsules have a size from 1 to 1000 μm; and
said battery cell pack has cold sensitive lithium ion batteries.

6. The battery configuration according to claim 1, wherein said PCM is selected from the group consisting of paraffins, salt hydrates, sugar alcohols and fatty acids.

7. The battery configuration according to claim 1, further comprising at least one additive selected from the group consisting of surfactants, dispersants, alkylbenzenesulphonate and polyvinylpyrrolidone.

8. A cooling element for maintaining a temperature of a battery cell pack, said cooling element comprising:
a molded cooling element body for maintaining a constant temperature of the battery cell pack, said molded cooling element body having a form-fitting connection with the battery cell pack, said molded cooling element body containing:
graphite;
a binder selected from the group consisting of epoxy resins and; and
microcapsules containing a phase change material (PCM).

9. The cooling element according to claim 8, wherein:
said graphite is 1 to 60 wt. %;
said microcapsules containing said PCM is 35 to 95 wt. %; and
said binder is 1 to 50 wt. %.

10. The cooling element according to claim 8, wherein said graphite is selected from the group consisting of natural graphite, graphite expandate, comminuted graphite film, synthetic graphite and any desired combination thereof.

11. The cooling element according to claim 10, wherein:
said natural graphite has particle sizes of between 149 and 840 μm;
said graphite expandate has particle sizes of between 5 and 30 mm;
said comminuted graphite film has particle sizes of between 5 and 1200 μm; and
said synthetic graphite has particle sizes of between 10 and 600 μm.

12. The cooling element according to claim 8, wherein:
said microcapsules have a size from 1 to 1000 μm; and
said molded cooling element body is L-shaped.

13. The cooling element according to claim 8, wherein:
aid PCM is selected from the group consisting of paraffins, salt hydrates, sugar alcohols and fatty acids; and
said molded cooling element body is formed in a curved shape.

14. The cooling element according to claim 8, further comprising at least one additive selected from the group consisting of surfactants, dispersants, alkylbenzenesulphonate and polyvinylpyrrolidone.

15. A method of producing a battery configuration, which comprises the steps of:
providing a battery cell;
forming a molded cooling element body containing a moldable mass having graphite, a binder selected from the group consisting of epoxy resins and fluoropolymers, and microcapsules having a phase change material (PCM); and
connecting the cooling element to the battery cell via a form-fitting connection.

16. A configuration, comprising:
a heat producing element selected from the group consisting of power electronics, electric motors, charging devices, and hub motors; and
a cooling element for maintaining a constant temperature of said heat producing element, said cooling element having a form-fitting connection with said heat producing element, said cooling element containing:
graphite;
a binder selected from the group consisting of epoxy resins and fluoropolymers; and
microcapsules containing a phase change material (PCM).

17. The cooling element according to claim 8, further comprising at least one further binder selected from the group consisting of geopolymers, water-soluble sodium, potassium silicates, phenol resins, silicone resins, polyester resins, thermoplastics and polypropylene.

* * * * *